Sept. 4, 1928. 1,683,050
W. PENZOLD
ELECTRIC RESISTANCE FOR ELECTRICALLY HEATED BOILERS
Filed Nov. 10, 1926
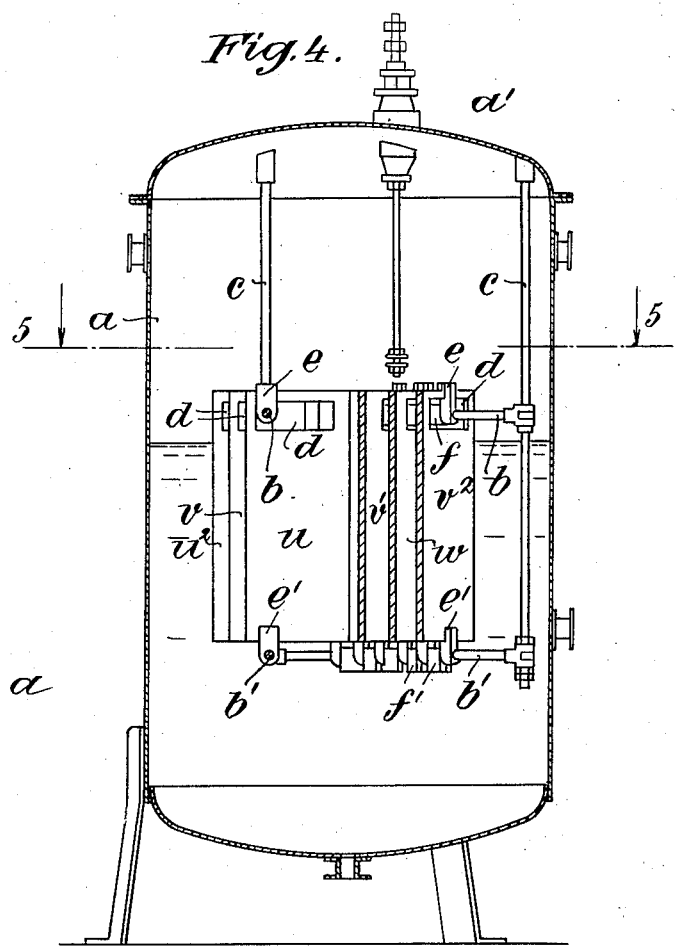
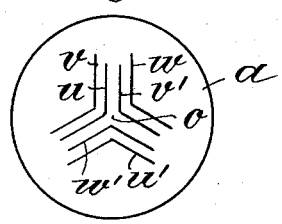
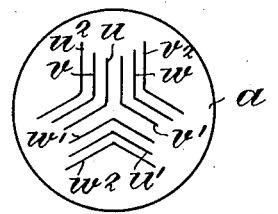
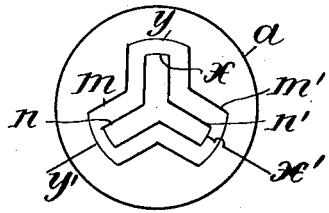
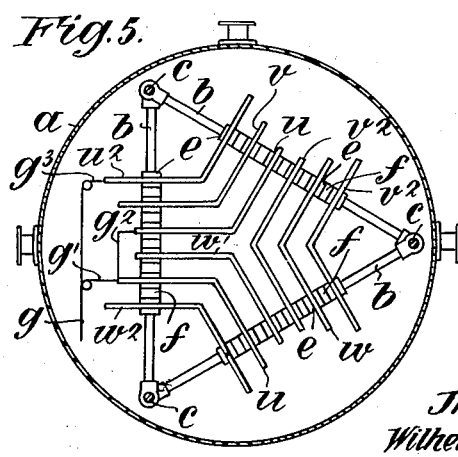
Inventor:
Wilhelm Penzold.
by:
Watson, Coit, Morse & Grindle
Attorney.

Patented Sept. 4, 1928.

1,683,050

UNITED STATES PATENT OFFICE.

WILHELM PENZOLD, OF HANOVER, GERMANY, ASSIGNOR TO THE FIRM WIDERSTAND AKTIENGESELLSCHAFT FÜR ELEKTRO-WÄRME-TECHNIK, OF HANOVER, GERMANY.

ELECTRIC RESISTANCE FOR ELECTRICALLY-HEATED BOILERS.

Application filed November 10, 1926, Serial No. 147,584, and in Germany November 25, 1925.

My invention relates to improvements in electric resistances for electrically heated boilers, and more particularly in boilers of the type in which the water itself provides the resistance for transforming the electric energy into heat, which boilers can be used for voltages up to about 1000 volts. In constructions now in use the electrodes are in the form of plates. The object of the improvements is to provide a boiler in which electrodes of a large total surface area can be disposed within the boiler, and in which dead spaces in which the water is not exposed to the heating action of the current are avoided. With these objects in view my invention consists in providing electrodes in the form of angular or curved plates and disposing the said plates within the boiler so that the plan view of the figure formed thereby resembles a star. When thus disposing the plates within the boiler the mechanical and electrical construction is simple. In case of three-phase alternating current the electrodes may be connected either in star connection or delta connection, and the neutral wire may be dispensed with, the neutral conductor being provided by the liquid itself.

My improved system may be used in connection with three-phase alternating current, as well as with single-phase alternating current. If plates providing a star having three branches are provided, and the electrodes are to be connected to a single-phase net, I connect one angular plate of each set with one terminal and the other plates with the other terminal, so that in each set of plates electrodes of different potential are opposed to each other. If in each set more than two plates are provided, say four or six plates, the plates of each set are alternately connected to the plus and minus terminals.

Further my invention relates to the manner of supporting the plate electrodes within the boiler.

For the purpose of explaining the invention several examples embodying the same have been shown in the accompanying drawing in which the same letters of reference have been used in all the views to indicate corresponding parts. In said drawing, Figs. 1 to 3, are diagrammatical plan views showing the manner of disposing the electrodes within the boiler, Fig. 4, is a sectional elevation showing my improved boiler and the plate electrodes mounted therein, and, Fig. 5, is a sectional plan view taken on the line 5—5 of Fig. 4.

In Fig. 1 I have shown an example in which three sets of angular plates $u$, $v$, $w$ and $u'$, $v'$, $w'$ are disposed star fashion within a boiler $a$, each branch of the star consisting of four plates. The said plates are connected in pairs to three terminals (not shown), the plates $u$ and $u'$ being connected to one terminal, the plates $v$, $v'$ to the second one, and the plates $w$, $w'$ to the third one, and the said terminals are connected to a three-phase net. Thus the current flows from one plate to another one which is adjacent and parallel thereto. At the middle of the star $a$ point $o$ has been indicated which indicates the neutral conductor provided by the water, a grounded neutral wire being thus dispensed with.

By varying the distance between the adjacent plates the resistance of the liquid to be traversed by the current is enlarged or reduced, so that the apparatus may be readily adapted to currents of different voltages. Further for increasing the effect of the heating system the number of the electrode plates may be increased.

In Fig. 2 I have shown a modification in which a third plate $u^2$, $v^2$, $w^2$ is added to each set of plates, which additional plates are connected respectively with the plates having similar reference characters.

In Fig. 3 I have shown a modification in which three sets of two angular plates $m$, $m'$, $m^2$ and $n$, $n'$, $n^2$ are connected to a single-phase net. As shown the outer plates $m$, $m'$, $m^2$ are connected with each other by wires $y$ and with a terminal $y'$, while the inner plates $n$, $n'$, $n^2$ are connected with each other by wires $x$ and to the other terminal $x'$. If each set comprises more than two plates the electrical connection is made in a similar way so that the plates are alternately connected to the positive and negative terminals.

In Figs. 4 and 5 I have shown the mechanical construction of my improved heating apparatus. The arrangement of the electrodes corresponds to that shown in Fig. 2, and the same letters of reference have been used to indicate corresponding parts. The electrodes consist of thin plates of cast-metal which can be manufactured at low cost, and they are formed at their top parts each with two transverse slots $d$. For supporting the plates three horizontal bars $b$ are provided which form a triangle and are connected at their ends to rods $c$ by means of which they are suspended from the head $a^1$ of the boiler. The bars $b$ are passed through the slots $d$, and they carry suitable insulating blocks $e$ on which the electrode plates are supported. The plates are held a proper distance away from one another by tubular spacing members $f$ placed on the bars and preferably made from insulating material. The lengths of the said spacing members may be different, and they may be exchanged in each system for varying the resistance of the water between adjacent electrode plates. In some cases I provide more than one comparatively short spacing member between adjacent plates for regulating the resistance of the water. Thus, when mounting the boiler the relative distance of the electrode plates can be readily adapted to the voltage of the current. By reason of the slots $d$ the relative distance of the plates supported on the angularly disposed bars can be varied within broad limits.

In the preferred construction a similar triangular frame consisting of bars $b'$ is provided at the bottom end of the plates $u, v, w$, which bars are likewise connected to the rods $c$, and which carry insulating blocks $e'$ and spacing members $f'$, the blocks $e'$ receiving the plates in slots provided at their top ends.

In Fig. 5 I have shown the electrical connection of the electrodes $u, u', u^2$, the said plates being connected by leads $g', g^2, g^3$ to a common lead $g$ connected with the net. It will be understood that the plates are connected to a three-phase current net.

In the figures I have shown electrode plates which are exactly alike in dimension, and ordinarily I prefer to use plates of similar size and construction in order to reduce the cost of the manufacture. But in some cases I use plates of different side lengths, the plates of larger sides being disposed in the median part of the sets, so that the outer edges of all the plates are disposed substantially equal distances away from the wall of the boiler. Further, in the system shown in Figs. 2 and 5 more than three plates of even polarity may be provided for more completely filling out the boiler.

In the figures I have shown plates which are exactly angular in form. But I wish it to be understood that I do not limit myself to this feature, and that in some cases the plates are rounded more or less at their corners. Further, in case of large boilers I prefer to use additional spacing members of insulating material between the adjacent plates. After the boiler has been mounted the effect of the heating system may be regulated by varying the level of the water relatively to the plates.

Theoretically speaking the electrode plates have the function of an electric resistance transforming electric energy into heat, and I wish it to be understood that I do not limit myself to the use of the said resistance in connection with a boiler for generating steam, and that I also contemplate the use of the said resistance for regulating the intensity of currents flowing through conductors.

I claim:

1. In an electrode assembly adapted for immersion in a conducting liquid, in combination, a plurality of electrode groups assembled in stellate formation, each electrode group including a plurality of spaced plates each having angularly disposed branches such that the branches of plates of adjacent groups are substantially parallel to each other and means to connect adjacent plates to different terminals of a source of current.

2. In an electrode assembly adapted for immersion in a conducting liquid, the combination with a plurality of spaced plates each having angularly disposed branches, of means for supporting each plate at both ends thereof so that the branches of adjacent plates are substantially parallel to each other, and means to connect adjacent plates to different terminals of a source of current.

3. In an electrode assembly adapted for immersion in a conducting liquid, the combination with a plurality of spaced plates each having angularly disposed branches and arranged in stellate formation, of a plurality of interconnected supporting members, each plate being mounted at its ends on separate members, and each member serving to support one end of two adjacent plates in such manner that the branches of adjacent plates will be disposed in parallel relationship, and means to connect adjacent plates to different terminals of a source of current.

4. In an electrode assembly adapted for immersion in a conducting liquid, in combination, a plurality of electrode groups assembled in stellate formation, each electrode group including a plurality of spaced plates each having angularly disposed branches such that the branches of plates of adjacent groups are substantially parallel to each other, a plurality of interconnected supporting members, each plate being mounted at its ends on separate members, and each member serving to support the plates of two adjacent groups, and means to connect adjacent plates to different terminals of a source of current.

In testimony whereof I hereunto affix my signature.

WILHELM PENZOLD.